United States Patent [19]
Weber et al.

[11] Patent Number: 5,824,750
[45] Date of Patent: Oct. 20, 1998

[54] PREPARATION OF POLYMERS CONTAINING OXAZINE GROUPS

[75] Inventors: Martin Weber, Neustadt; Rolf Mülhaupt; Jörg Kressler, both of Freiburg; Philipp Müller; Rüdiger Schäfer, both of Gundelfingen, all of Germany

[73] Assignee: BASF Aktiengesellschaft, Ludwigshafen, Germany

[21] Appl. No.: 760,808

[22] Filed: Dec. 5, 1996

[30] Foreign Application Priority Data

Feb. 21, 1996 [DE] Germany .................. 196 06 198.9

[51] Int. Cl.⁶ .................................................. C08G 65/48
[52] U.S. Cl. .................... 525/390; 525/390; 525/397; 525/534; 528/117
[58] Field of Search .................. 525/390, 534, 525/397, 906; 528/117

[56] References Cited

U.S. PATENT DOCUMENTS

| | | | |
|---|---|---|---|
| 3,509,231 | 4/1970 | Ranck | 548/238 |
| 3,509,235 | 4/1970 | Riemhofer et al. | 525/906 |
| 3,651,014 | 3/1972 | Witdepe | 525/397 |
| 3,716,520 | 2/1973 | Tomalia | 528/117 |
| 4,652,607 | 3/1987 | Stix et al. | 525/390 |
| 5,457,169 | 10/1995 | Weber et al. | 525/534 |

FOREIGN PATENT DOCUMENTS 146 965  7/1985  European Pat. Off. .

OTHER PUBLICATIONS

Synthesis of Reactive Oxazolyl Styrene–Acrylonitrile Copolymers, Hseih et al. Jor. Applied Polm. Sci, vol. 56, 1673–1677, 1995.

Derwent Pub. 27415A/15.

*Primary Examiner*—Terressa Mosley
*Attorney, Agent, or Firm*—Keil & Weinkauf

[57] ABSTRACT

Polymers (A) containing oxazine groups are prepared by reacting a polymer (T) containing nitrile groups with a monoaminoalcohol in the presence of a catalyst by a process in which the polymer T is reacted in the melt with the monoaminoalcohol in the presence of the catalyst and in the absence of a solvent.

26 Claims, No Drawings

PREPARATION OF POLYMERS CONTAINING OXAZINE GROUPS

The present invention relates to a process for the preparation of polymers (A) containing oxazine groups by reacting a polymer (T) containing nitrile groups with a monoaminoalcohol in the presence of a catalyst.

It was known that the nitrile groups of styrene/acrylonitrile copolymers can be converted into oxazine groups with amino alcohols in the presence of zinc salts (J. App. Pol. Sci., 56 (1995) 1673–1677, and Japanese preliminary published application 5 0160 392). However, the reaction must be carried out in the presence of a solvent (1,2-dichlorobenzene or dimethylformamide). Furthermore, it is stated that the reaction takes place particularly smoothly when the catalyst is used in solution (n-butanol). The disadvantage of the known method is not only that it requires a solvent but also the extremely long reaction times.

Mixtures of polymers containing oxazoline groups and polymers having groups which are reactive to oxazoline groups are described in U.S. Pat. No. 3,509,235 and EP-A 146 965, but not advantageous processes for their preparation.

It is an object of the present invention to provide a novel process for the preparation of polymers containing oxazine groups and molding materials based on such polymers.

We have found that this object is achieved by a process for the preparation of a polymer (A) containing oxazine groups by reacting a polymer (T) containing nitrile groups with a monoaminoalcohol in the presence of a catalyst, wherein the polymer T is reacted in the melt with the monoaminoalcohol in the presence of a catalyst and in the absence of a solvent.

Suitable polymers T containing nitrile groups are in principle all polymers which contain nitrile groups and which are fusible.

Preferred polymers T contain in general from 0.5 to 80, preferably from 0.7 to 70, % by weight, based on the total weight of all units, of units ($a_1$), which are derived from acrylonitrile or alkylacrylonitrile, among which acrylonitrile or $C_1$–$C_{10}$-alkylacrylonitrile, in particular $C_1$–$C_3$-alkylacrylonitrile, is preferred. Very particularly preferably, the polymers T contain units which are derived from acrylonitrile or methacrylonitrile.

In addition to the units $a_1$, the preferred polymers T contain from 20 to 99.5, preferably from 30 to 99.3, % by weight, based on the total weight of all units, of units ($a_2$) which are derived from vinylaromatic compounds, vinyl esters, acrylates or further copolymerizable monomers. The polymers T may also contain mixtures of different units $a_2$. The preferred vinylaromatic compounds include styrene, styrenes alkylated on the nucleus and α-alkylstyrenes, such as α-methylstyrene, in particular styrene. Examples of preferred vinyl esters are vinyl-$C_2$–$C_{10}$-alkyl esters, in particular vinyl acetate. Examples of preferred acrylates are acrylates where the alcohol component is of 2 to 10 carbon atoms, such as ethyl, propyl, butyl, hexyl, or 2-ethylhexyl acrylate, preferably butyl acrylate. In addition to these monomers, further copolymerizable monomers which do not react with oxazine groups may also be present. N-phenylmaleimide is an example of such copolymerizable monomers.

The polymers T may be random copolymers or block copolymers. In addition, the polymers T may be graft copolymers, for example having an elastomeric grafting base and one or more grafts. Natural rubber, synthetic rubber or polymers based on conjugated dienes and elastomers based on $C_1$–$C_{10}$-alkyl esters of acrylic acid or crosslinked siloxanes may be used, for example, as the grafting base.

Polystyrene-co-acrylonitrile, terpolymers based on styrene, acrylonitrile and N-phenylmaleimide, graft copolymers, such as acrylonitrile/butadiene/styrene (ABS), acrylate/stryene/acrylonitrile (ASA) or acrylonitrile/ethylene/styrene (AES) rubbers and hydrogenated or unhydrogenated nitrile rubbers based on acrylates, vinyl esters, dienes and acrylonitrile, as described in DE-A 33 02 124, are among the preferred polymers T.

According to the invention, the polymer T is reacted with a monoaminoalcohol, preferred monoaminoalcohols being those of the general formula I:

where $R^1$ to $R^4$, independently of one another, may each be hydrogen, $C_1$–$C_{10}$-alkyl, $C_1$–$C_{10}$-alkylaryl or $C_6$–$C_{18}$-aryl.

n may be an integer from 1 to 5, in particular 1 or 2. The alkyl radicals are either linear or branched. Examples of suitable alkyl radicals are methyl, ethyl, n-propyl, isopropyl, n-butyl, i-butyl and tert-butyl, preferably methyl. A preferred alkylaryl radical is methylphenyl. An example of a preferred aryl radical is phenyl. $R^1$ to $R^4$ are each particularly preferably hydrogen. 1,2-aminoethanol is very particularly preferably used. According to the invention, a monoaminoalcohol is also understood as meaning a mixture of different monoaminoalcohols.

Compounds which form complexes with the nitrile groups to be reacted, with the monoaminoalcohol or with both reactants have catalytic activity. Very suitable catalysts are metal salts, in particular salts of zinc or of cadmium. These may be either hydrated or anhydrous. Zinc chloride, zinc acetate, zinc stearate and cadmium acetate are particularly preferred. Among these, zinc acetate dihydrate and cadmium acetate dihydrate are particularly preferred, especially zinc acetate dihydrate. However, mixtures of different complex-forming compounds are also suitable as catalysts.

In the novel process, polymer T is first melted. All apparatuses suitable for working up polymer melts may be used for this purpose. The polymer T is preferably melted in a kneader or an extruder. In general, the polymers T are present as a melt at from 150° to 300° C. According to the invention, the catalyst and the monoaminoalcohol are added to the melt. In general from 0.005 to 0.2 mol of catalyst is used per mol of nitrile groups. The monoaminoalcohol is used as a rule in amounts of from 0.05 to 10 mol per mol of nitrile groups. As a rule, the reaction takes place in the stated temperature range in the course of from 0.5 to 90, preferably from 0.5 to 60, in particular from 0.5 to 40, minutes.

The polymer A containing oxazine groups prepared in this manner can be discharged by methods known per se, cooled, purified and, for example, processed to give granules or injection molded. The polymer A is suitable for the production of moldings, fibers or films, in particular, however, as a blend component in molding materials.

In order to prepare molding materials according to the invention, the polymer A prepared in a first step can, as described above, be used in the form of granules and mixed with further components in a second step. It is also possible to use a mixture of different polymers A. However, it has also proven advantageous to convert the polymer T in a first step, as described above, into the polymers A containing oxazine groups and to mix the latter in a second step, without further working up, with the other blend components. The polymer A can be mixed with the other components in the presence of catalysts which activate the reaction of the oxazine groups with those groups of other blend components which are reactive toward oxazines. Lewis acids, such as phosphonium or ammonium salts, are examples of catalysts suitable for this purpose.

The components of the molding materials can be mixed in conventional mixing apparatuses, such as extruders, preferably twin screw-extruders, Brabender mixers, Banbury mixers and kneaders, and then extruded. After extrusion, the extrudate is cooled and comminuted. The order of mixing may be varied; thus two or three components may be premixed. However, it is also possible to mix all components together.

Thorough mixing is advantageous for obtaining a very homogeneous mixture. In general, average mixing times of from 0.2 to 30 minutes at from 160° to 320° C., preferably from 200° to 300° C., are required for this purpose.

Molding materials based on from 1 to 90, preferably from 1 to 80, % by weight, based on the sum of all components, of oxazine-containing polymers A and from 10 to 99, preferably from 20 to 99, % by weight, based on the sum of all components, of polymers having groups (B) reactive toward oxazine groups are prepared by the novel process. Furthermore, the molding materials may contain from 0 to 90, preferably from 0 to 80, % by weight of polymers which contain no groups (C) reactive toward oxazine groups. The molding materials may contain, as a further component, from 0 to 45, preferably from 0 to 30, % by weight, based on the sum of all components, of rubber impact modifiers (D). Fibrous or particulate fillers or mixtures thereof may be present as a further component (E) in the molding materials obtainable by the novel process, in amounts of from 0 to 60, preferably from 0 to 45, % by weight, based on the sum of all components. The molding materials may furthermore contain from 0 to 60, preferably from 0 to 30, % by weight, based on the sum of all components, of further additives (F).

Examples of suitable polymers B are polymers which contain carboxyl or amino groups. If catalysts which promote the reaction of oxazine groups with mercapto, hydroxyl, epoxy or anhydride groups are present, polymers having such functional groups may also be used as component B. Particularly preferred components (B) are polyesters, polyamides, polycarbonates, and polyarylene ethers, polyolefins or thermoplastic elastomers modified with the stated groups.

Suitable polyesters are known per se and are described in the literature. Partly aromatic polyesters are preferably used. They contain, in the main chain, an aromatic ring which is derived from an aromatic dicarboxlylic acid. The aromatic ring can also be substituted, for example by halogen, chlorine or bromine, or by $C_1$–$C_4$-alkyl, such as methyl, ethyl, n-propyl, isopropyl, n-butyl, isobutyl or tert-butyl.

The polyesters can be prepared, for example, by reaction of aromatic dicarboxylic acids, esters thereof or other ester-forming derivatives thereof with aliphatic dihydroxy compounds in a manner known per se.

Examples of preferred dicarboxylic acids are naphthalenedicarboxylic acid, terephthalic acid and isophthalic acid and mixtures thereof. Up to 10 mol % of the aromatic dicarboxylic acids can be replaced by aliphatic or cycloaliphatic dicarboxylic acids, such as adipic acid, azelaic acid, sebacic acid, dodecanedioic acids or cyclohexanedicarboxylic acids.

Among the aliphatic dihydroxy compounds, diols of 2 to 6 carbon atoms, in particular 1,2-ethanediol, 1,4-butanediol, 1,4-hexanediol, 1,6-hexanediol, 1,4-cyclohexanediol, neopentylglycol or mixtures thereof, are preferred.

Examples of particularly preferred polyesters are polyalkylene terephthalates derived from alkanediols of 2 to 6 carbon atoms. Among these, polyethylene terephthalate, polyethylene naphthalate, polybutylene terephthalate and polybutylene naphthalate are particularly preferred.

The viscosity number of the polyesters is in general from 60 to 200 ml/g (measured in a 0.5% strength by weight solution in a phenol/o-dichlorobenzene mixture (weight ratio of 1:1) at 25° C.).

Very generally, polyamides having an aliphatic semicrystalline or partly aromatic and amorphous structure of any type or blends thereof are preferred. Appropriate products are obtainable, for example, under the trade name Ultramid® from BASF AG.

Suitable polycarbonates are known per se. They are obtainable, for example, by interfacial polycondensation according to the process of DE-B-1 300 266 or by reacting biphenyl carbonate with bisphenols according to the process of DE-A-1 495 730. A preferred bisphenol is 2,2-(di(4-hydroxyphenyl)propane, referred to in general, as also below, as bisphenol A.

Instead of bisphenol A, it is also possible to use other aromatic dihydroxy compounds in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di-(4-hydroxyphenyl)ethane or 4,4-dihydroxydiphenyl, 1,1'-bis(4,4'-hydroxyphenyl)-2,2',4-trimethylcyclohexane and mixtures of the abovementioned dihydroxy compounds.

Particularly preferred polycarbonates are those based on bisphenol A or bisphenol A together with up to 30 mol % of the abovementioned aromatic dihydroxy compounds.

The relative viscosity of these polycarbonates is in general from 1.1 to 1.5, in particular from 1.28 to 1.4 (measured at 25° C. in a 0.5% strength by weight solution in dichloromethane).

Modified polyarylene ethers are known per se or are obtainable by processes known per se. Thus, polyphenylene ethers can be grafted, for example, with maleic anhydrides in the presence of organic peroxides as radical initiators. Moreover, it is known that polyphenylene ethers can be grafted with maleimide, fumaric acid or maleic half-esters. DE-A-37 25 112 discloses, for example, polyphenylene ethers grafted with mono-2-(meth)acryloxyethyl maleate. Suitable polyarylene ether sulfones or ketones modified with anhydride groups are described, for example, in DE-A-4 110 460. Polyarylene ethers which contain terminal anhydride groups are also suitable (cf. for example EP-A 613 916).

Modified polyolefins are obtainable, as a rule, by free radical polymerization of the olefins with olefinically unsaturated acids, esters or anhydrides. Examples are polyethylene-co-acrylic acid, polyethylene-co-maleic acid and polyethylene-co- . . . . Further suitable modified polyolefins are obtainable by free radical grafting of polyolefins with olefinically unsaturated acids, esters or anhydrides, such as polypropylene-g-maleic anhydride or polypropylene-g-acrylic acid.

For example, polyarylene ethers, in particular polyarylene ether sulfones or polyphenylene ethers, polystyrenes, polyolefins, in particular polyethylenes or polypropylenes, or polymethacrylates, each of which contain no groups reactive toward oxazines, may be used as component C. Polyarylene ether sulfones and polyphenylene ethers are commercially available, for example, from BASF Aktiengesellschaft, under the names Ultrason® and Luranyl®, respectively. Among the polymethacrylates, polymethylmethacrylate and copolymers based on methyl methacrylate with up to 40% by weight of further copolymerizable monomers are preferred. Such polymers are available, for example, under the names Lucryl® from BASF Aktiengesellschaft or Plexiglas from Röhm GmbH. The polystyrenes suitable as component C include acrylonitrile-containing polystyrenes. Among these, the polymers T based on styrene and acrylonitrile, as described above, are preferred.

In addition to the components A to C, the molding materials obtainable by the novel process may contain rubber impact modifiers E.

Examples of rubbers which increase the toughness of the blends are EP and EPDM rubbers.

Copolymers of α-olefins may also be mentioned. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers may also be used.

Preferred core-shell graft rubbers contain a soft core and a hard shell or a hard core, a first soft shell and at least one further hard shell. Here, functional groups, such as carbonyl, carboxyl, anhydride, amido, imido, carboxylic ester, amino, hydroxyl, epoxy, oxazoline, urethane, urea, lactam or halobenzyl, are preferably incorporated by adding suitably functionalized monomers during the polymerization of the final shell. Examples of suitable functionalized monomers are maleic acid, maleic anhydride, mono- or diesters of maleic acid, tert-butyl (meth)acrylate, acrylic acid or glycidyl (meth)acrylate. The amount of monomers with functional groups is in general from 0.1 to 25, preferably from 0.25 to 15, % by weight, based on the total weight of the core-shell graft rubber. The weight ratio of soft to hard components is in general from 1:9 to 9:1, preferably from 3:7 to 8:2.

Such rubbers are known per se or are obtainable by methods known per se.

A further group of suitable impact modifiers comprises thermoplastic polyester elastomers. Polyester elastomers are understood as meaning segmented copolyether esters which contain long-chain segments which, as a rule, are derived from poly(alkylene) ether glycols and short-chain segments which are derived from low molecular weight diols and dicarboxylic acids. Such products are known per se and are described in the literature, for example in U.S. Pat. No. 3,651,014. Appropriate products are also commercially available under the names Hytrel® (Du Pont), Arnitel® (Akzo) and Pelprene® (Toyobo Co. Ltd.).

Mixtures of different rubbers may of course also be used.

Preferred fibrous fillers or reinforcing materials which may be used as component E are carbon fibers, potassium titanate whiskers, aramid fibers and particularly preferably glass fibers. When glass fibers are used, they may be provided with a size and an adhesion promoter to improve the compatibility with the matrix material. In general, the carbon and glass fibers used have a diameter of from 6 to 20 μm.

The glass fibers may be incorporated both in the form of milled glass fibers and in the form of rovings. In the finished injection molded part, the average length of the glass fibers is preferably from 0.04 to 0.5 mm.

Carbon or glass fibers may also be used in the form of woven fabrics, mats or multifilament glass rovings.

Particularly suitable particulate fillers are amorphous silica, magnesium carbonate (chalk)>powdered quartz, mica, talc, feldspar, glass beads and in particular calcium silicates, such as wollastonite and kaolin (in particular calcined kaolin).

The molding materials may furthermore contain additives as component E.

Conventional additives are, for example, stabilizers and antioxidants, heat stabilizers and UV stabilizers, flameproofing agents, lubricants and mold release agents, dyes and pigments and plasticizers.

Pigments and dyes are generally present in amounts of up to 6, preferably 0.5 to 5, in particular 0.5 to 3, % by weight.

The pigments for coloring thermoplastics are generally known, cf. R. Gächter and H. Müller, Taschenbuch der Kunststoffadditive, Carl Hanser Verlag, 1983, pages 494 to 510. A first preferred group of pigments comprises white pigments, such as zinc oxide, zinc sulfide, lead white (2 $PbCO_3.Pb(OH)_2$), lithopone, antimony white and titanium dioxide. Of the two most commonly used crystal modifications (rutile and anatase types) of titanium dioxide, in particular the rutile form is used for imparting whiteness to the novel molding materials.

Black pigments which may be used according to the invention are iron oxide black ($Fe_3O_4$), spinel black (Cu(Cr, Fe)$_2O_4$), manganese black (a mixture of manganese dioxide, silica and iron oxide), cobalt black and antimony black and particularly preferably carbon black, which is generally used in the form of furnace black or gas black (in this context, cf. G. Benzing, Pigmente für Anstrichmittel, Expert-Verlag (1988), page 78 et seq.).

Inorganic colored pigments such as chrome oxide green, or organic colored pigments such as azo pigments and phthalocyanines, may of course be used according to the invention for establishing certain hues. Such pigments are in general commercially available.

Antioxidants and heat stabilizers which may be added to the thermoplastic materials according to the invention are, for example, halides of metals of Group I of the Periodic Table, for example sodium, potassium and lithium halides, if necessary in combination with copper (I) halides, e.g. chlorides, bromides or iodides. The halides, in particular those of copper, may also contain electron-rich π ligands. Examples of such copper complexes are copper halide complexes with, for example, triphenylphosphine. Zinc fluoride and zinc chloride may also be used. Furthermore, stearically hindered phenols, hydroquinones, substituted members of this group, secondary aromatic amines, if necessary in combination with phosphorus-containing acids or salts thereof, and mixtures of these compounds may be used, preferably in concentrations of up to 1% by weight, based on the weight of the mixture.

In particular, phosphorus-containing compounds in amounts of up to 20, preferably up to 10% by weight, may be used as flameproofing agents. Examples of these are phosphoric esters, phosphinic esters, phosphine oxides, phosphorus and organic phosphates. The phosphorus-containing compounds may also be used as a mixture with a triazine derivative or polytetrafluoroethylene. Triarylphosphine oxides or triaryl phosphates are preferably used.

Examples of UV stabilizers are various substituted resorcinols, salicylates, benzotriazoles and benzophenones, which are used in general in amounts of up to 2% by weight.

Lubricants and mold release agents, which as a rule are added to the thermoplastic material in amounts of up to 1% by weight, are stearic acid, stearyl alcohol, alkyl stearates and stearamides and esters of pentaerythritol with long-chain fatty acids. Salts of calcium, of zinc or of aluminum with stearic acid and dialkyl ketones, e.g. distearyl ketone, may also be used.

The molding materials prepared by the novel process are suitable for the production of moldings, films or fibers.

EXAMPLES

VN: Viscosity number

DMF: Dimethylformamide

Preparation of the polymers containing oxazine groups

Component $A_1$ 54 g of polystyrene-co-acrylonitrile (25% by weight of acrylonitrile, VN=82 ml/g, measured in 0.5% strength by weight solution in DMF) were melted at 200° C. in a reaction kneader. After the polymer had completely melted, 0.44 g of zinc acetate dihydrate and a total of 2.5 ml of 1,2-aminoethanol were added dropwise. After a reaction time of 60 minutes, the polymer was discharged from the kneader. The amount of oxazoline units was determined as 0.5% by weight by means of FT-IR.

Component $A_2$ 54 g of polystyrene-co-acrylonitrile (25% by weight of acrylonitrile, VN=82 ml/g, measured in 0.5% strength by weight solution in DMF) were melted at 200° C. in a reaction kneader. After the polymer had completely melted, 0.2 g of zinc acetate dihydrate and a total of 0.5 ml of 1,2-aminoethanol were added dropwise. After a reaction time of 30 minutes, the polymer was discharged from the kneader. The amount of oxazoline units was determined as 0.4% by weight by means of FT-IR.

Component $A_3$

In a reaction extruder (ZSK 30, Werner & Pfleiderer), 6 kg of polystyrene-co-acrylonitrile (25% by weight of acrylonitrile, VN=82 ml/g, measured in 0.5% strength by weight solution in DMF) were reacted with 60 g of zinc acetate dihydrate and 200 g of 1,2-aminoethanol at a melt temperature of 230° C. and at a speed of 250 $min^{-1}$. The residence time was about 2 minutes. The product was granulated and dried. The amount of oxazoline units was determined as 0.4% by weight by means of FT-IR.

For comparison: Component A*

Polystyrene-co-acrylonitrile (25% by weight of acrlylonitrile, VN=82 ml/g, measured in 0.5% strength by weight solution in DMF).

Component $B_1$

Polybutylene terephthalate, e.g. Ultradur® B 4520 from BASF Aktiengesellschaft, characterized by a tensile modulus of elasticity of 2600 $N/mm^2$.

Component $B_2$

Polyphenylene ether-g-fumaric acid having a weight average molecular weight of 61,000 g/mol and containing 0.4% by weight of fumaric acid (determined by potentiometric titration).

Component D

Glass rovings having a thickness of 10 μm comprising E glass, which have been treated with a polyurethane size. After incorporation, the average length of the glass fibers was from about 0.1 to 0.5 mm.

Preparation of the molding materials and testing of their performance characteristics The components, in the form of their granules or as rovings, were mixed, melted and homogenized in a mini-max. molder or a twin-screw extruder. The melt of the molding materials obtained was passed through a water bath and granulated.

The homogeneity of the molding materials was tested by means of optical microscopy and qualitatively evaluated (1: good; 0: poor).

Furthermore, the mechanical properties of the samples prepared by means of an extruder were determined.

The tensile strength and elongation at break of the products were determined according to ISO 527 using tensile test bars. The impact strength of the products was determined using ISO bars according to ISO 179 leu.

The compositions of the molding materials and the results of the tests are shown in Tables 1 and 2.

TABLE 1

| Unreinforced molding materials | | |
|---|---|---|
| Component | Molding material No. | |
| [% by wt.] | 1 | V1* |
| $A_1$ | 70 | — |
| $B_2$ | 30 | 30 |
| A* | — | 70 |
| Homogeneity | 1 | 0 |

*Comparative Experiment

TABLE 2

| Reinforced molding materials | | | | |
|---|---|---|---|---|
| Component | Molding material No. | | | |
| [% by wt.] | 2 | 3 | V2* | V3* |
| $A_3$ | 10 | 10 | — | — |
| $B_1$ | 60 | — | 60 | — |
| A* | 20 | 80 | 30 | 90 |
| D | 10 | 10 | 10 | 10 |
| Strength [$N/mm^2$] | 95 | 85 | 79 | 74 |
| Elongation at break [%] | 4,7 | 3,2 | 3 | 1,5 |
| $a_n$ [$kJ/m^2$] | 53 | 24 | 35 | 13 |

*Comparative Experiment

We claim:

1. A process for the preparation of a polymer (A) containing oxazine groups by reacting a polymer (T) containing nitrile groups with a monoaminoalcohol in the presence of a catalyst, wherein the polymer T is reacted in the melt with the monoaminoalcohol in the presence of the catalyst and in the absence of a solvent.

2. A process as defined in claim 1, wherein the polymer T used is a polymer based on styrene and acrylonitrile.

3. A process as defined in claim 1, wherein the monoaminoalcohol used is a 1,2-aminoalcohol.

4. A process as defined in claim 1, wherein the monoaminoalcohol used is 1,2-aminoethanol.

5. A process as defined in claim 1, wherein the catalyst used is a zinc or cadmium salt.

6. A process as defined in claim 1, wherein from 0.05 to 10 mol of monoaminoalcohol are used per mol of nitrile groups.

7. A process as defined in claim 1, wherein from 0.005 to 0.2 mol of catalyst is used per mol of nitrile groups.

8. A process for the preparation of a molding material based on
   A) from 1 to 90% by weight of polymers (A) containing oxazine groups,
   B) from 10 to 99% by weight of polymers having groups (B) reactive toward oxazine groups,
   C) from 0 to 90% by weight of polymers which contain no groups (C) reactive toward oxazine groups,
   D) from 0 to 45% by weight of rubber impact modifiers,
   E) from 0 to 60% by weight of fibrous or particulate fillers or mixtures thereof, and
   G) from 0 to 60% by weight of further additives,
   wherein, in a first step, polymers T containing nitrile groups are reacted in the melt with a monoaminoalcohol in the presence of a catalyst and in the absence of a solvent to give the polymers A and, in a second step, the polymers A are mixed with the other components.

9. A process as defined in claim 2, wherein the monoaminoalcohol used is a 1,2-aminoalcohol.

10. A process as defined in claim 2, wherein the monoaminoalcohol used is 1,2-aminoethanol.

11. A process as defined in claim 2, wherein the catalyst used is a zinc or cadmium salt.

12. A process as defined in claim 3, wherein the catalyst used is a zinc or cadmium salt.

13. A process as defined in claim 4, wherein the catalyst used is a zinc or cadmium salt.

14. A process as defined in claim 2, wherein from 0.05 to 10 mol of monoaminoalcohol are used per mol of nitrile groups.

15. A process as defined in claim 3, wherein from 0.05 to 10 mol of monoaminoalcohol are used per mol of nitrile groups.

16. A process as defined in claim 4, wherein from 0.05 to 10 mol of monoaminoalcohol are used per mol of nitrile groups.

17. A process as defined in claim 5, wherein from 0.05 to 10 mol of monoaminoalcohol are used per mol of nitrile groups.

18. A process as defined in claim 2, wherein from 0.005 to 0.2 mol of catalyst is used per mol of nitrile groups.

19. A process as defined in claim 3, wherein from 0.005 to 0.2 mol of catalyst is used per mol of nitrile groups.

20. A process as defined in claim 4, wherein from 0.005 to 0.2 mol of catalyst is used per mol of nitrile groups.

21. A process as defined in claim 5, wherein from 0.005 to 0.2 mol of catalyst is used per mol of nitrile groups.

22. A process as defined in claim 6, wherein from 0.005 to 0.2 mol of catalyst is used per mol of nitrile groups.

23. A molding material obtained by a process as defined in claim 8.

24. A molding formed from the molding material defined in claim 23.

25. A film formed from the molding material defined in claim 23.

26. A fiber formed from the molding material defined in claim 23.

* * * * *